United States Patent [19]

Zymboly

[11] Patent Number: 5,244,752
[45] Date of Patent: Sep. 14, 1993

[54] APPARATUS TUBE CONFIGURATION AND MOUNTING FOR SOLID OXIDE FUEL CELLS

[75] Inventor: Gregory E. Zymboly, Murrysville, Pa.

[73] Assignee: Westinghouse Electric Corp., Pittsburgh, Pa.

[21] Appl. No.: 802,788

[22] Filed: Dec. 6, 1991

[51] Int. Cl.$^5$ .............................................. H01M 8/12
[52] U.S. Cl. ........................................ 429/31; 429/36
[58] Field of Search .................... 429/30, 31, 35, 36

[56] References Cited

U.S. PATENT DOCUMENTS

| | | | |
|---|---|---|---|
| 4,374,184 | 2/1983 | Somers et al. | 429/17 |
| 4,395,468 | 7/1983 | Isenberg | 429/31 |
| 4,664,986 | 5/1987 | Draper et al. | 429/26 |
| 4,729,931 | 3/1988 | Grimble | 429/17 |
| 4,751,152 | 6/1988 | Zymboly | 429/31 |
| 4,876,163 | 10/1989 | Reichner | 429/30 |
| 4,898,792 | 2/1990 | Singh et al. | 429/31 X |
| 4,983,471 | 1/1991 | Reichner et al. | 429/31 X |
| 5,103,871 | 4/1992 | Misawa et al. | 429/31 X |
| 5,108,850 | 4/1992 | Carlson et al. | 429/31 |

Primary Examiner—Stephen Kalafut
Attorney, Agent, or Firm—Daniel P. Cillo

[57] ABSTRACT

A generator apparatus (10) is made containing long, hollow, tubular, fuel cells containing an inner air electrode (64), an outer fuel electrode (56), and solid electrolyte (54) therebetween, placed between a fuel distribution board (29) and a board (32) which separates the combustion chamber (16) from the generating chamber (14), where each fuel cell has an insertable open end and in insertable, plugged, closed end (44), the plugged end being inserted into the fuel distribution board (29) and the open end being inserted through the separator board (32) where the plug (60) is completely within the fuel distribution board (29).

10 Claims, 3 Drawing Sheets

APPARATUS TUBE CONFIGURATION AND MOUNTING FOR SOLID OXIDE FUEL CELLS

The Government of the United States of America has rights in this invention pursuant to Contract No. DE-AC21-80ET-17089, awarded by the United States Department of Energy.

BACKGROUND OF THE INVENTION

This invention relates to a tube configuration, and mounting for solid oxide fuel cells between a fuel distribution board, and a separator between the generating chamber and combustion chamber, in a tubular, high temperature, solid oxide fuel cell generator apparatus.

High temperature solid oxide fuel cell configurations and generators are well known, and taught, for example, in U.S. Pat. Nos. 4,374,184 (Somers et al.); 4,395,468 (Isenberg); 4,664,986 (Draper et al.); 4,729,931 (Grimble) and 4,751,152 (Zymboly). In these designs, the fuel cells are held in place, primarily by the separator board between the generating chamber and the combustion chamber in the apparatus. The closed ends of the tubes themselves are flat, or more commonly, rounded off, and usually contain an end plug with a flat or domed interior surface. The open ends of the tubes can be tapered near the separator board as shown in U.S. Pat. No. 4,876,163 (Reichner).

In these designs, the generator apparatus is usually operated with the oxidant inlet of the fuel cell tubes up, and the fuel inlet down, and the fuel cells are disposed perpendicular to the ground or plant floor, so that the cells "hang" suspended perpendicular to their separator board support. In some instances, as shown in FIG. 4 of U.S. Pat. No. 4,876,163 (Reichner), the fuel cell tubes, are also supported at the bottom closed end by an insert between the tube and the fuel distribution board. All the cells are bound together and electrically connected by nickel fiber metal strips on the sides of all the cells, binding each cell to its surrounding cells.

In these designs, there is a chance of cell movement due to possible shrinkage of the fiber metal strips after long term continuous operation at 1000° C. Also, the sealed, flat or rounded end of the tubular cells, which must be thin to allow deposition of exterior air electrode, can leak oxidant through the thin end plug. Generally, these tubular cells comprise a supported or unsupported, air electrode, upon which other components are deposited.

The preferred, unsupported air electrode tube is generally extruded. The nature of the extrusion process produces a tube that is open at both ends and must later be plugged at one end to be useful. Closing one end while the tube is still in the plastic state is difficult and could introduce defects. As a result, end closures are made on dried green tubes by insertion of a damp plug and pressing the plug to the inner surface of the green tube. Since a wet plug is introduced into a dried tube, a poor interfacial bond can result and defects in the form of separation cracks can occur. These defects are a concern, since present cell geometry requires this plugged area to remain in the generator proper. Appropriate cell configuration and mounting is desired to eliminate such potential problems. It is a main object of this invention to provide such a configuration and mounting.

SUMMARY OF THE INVENTION

Accordingly, the invention resides in a solid oxide fuel cell generator apparatus having a combustion chamber and a generating chamber and containing enclosed, long, hollow, tubular, solid oxide fuel cells containing an inner air electrode, an outer fuel electrode and solid electrolyte therebetween, said cells placed in the generator chamber between a fuel distribution board, and a separator which separates the combustion chamber from the generating chamber, characterized in that each fuel cell has an insertable open end and an insertable, plugged, closed end, the plugged end being disposed within the fuel distribution board and the open end being disposed within the separator, and the plugged end of the fuel cell contains plug material disposed a distance into the hollow tube, where the plug material is completely within the fuel distribution board, sealing such end from possible gas leaks.

This apparatus can operate at temperatures of from 600° to 1200° C. in a flow of fuel gas and oxygen or air, and also have associated with it well known auxiliaries such as controls, an oxygen or air preheater, a fuel gas compressor, a source of fuel gas, and a heat recovery unit to recover heat from the hot fuel cell exhaust gases to provide an electrical power generation system.

Thus, in this design the plug is removed from the generating chamber and even a defect that may produce a crack would not cause open burning or hot spots. This design would further keep the cells registered so as not to block fuel inlet holes in the fuel distribution board, and the cell end plugs could be made thicker and more dense than in prior designs. This increase in thickness would make small defects less critical. Also, such solid support at both ends of the cells would prevent cell sagging and allow facilitation of longer cells.

BRIEF DESCRIPTION OF THE DRAWINGS

In order that the invention can be more clearly understood, convenient embodiments thereof will now be described, by way of example, with reference to the accompanying drawings, in which.

DESCRIPTION OF THE PREFERRED EMBODIMENTS

Figure 1:
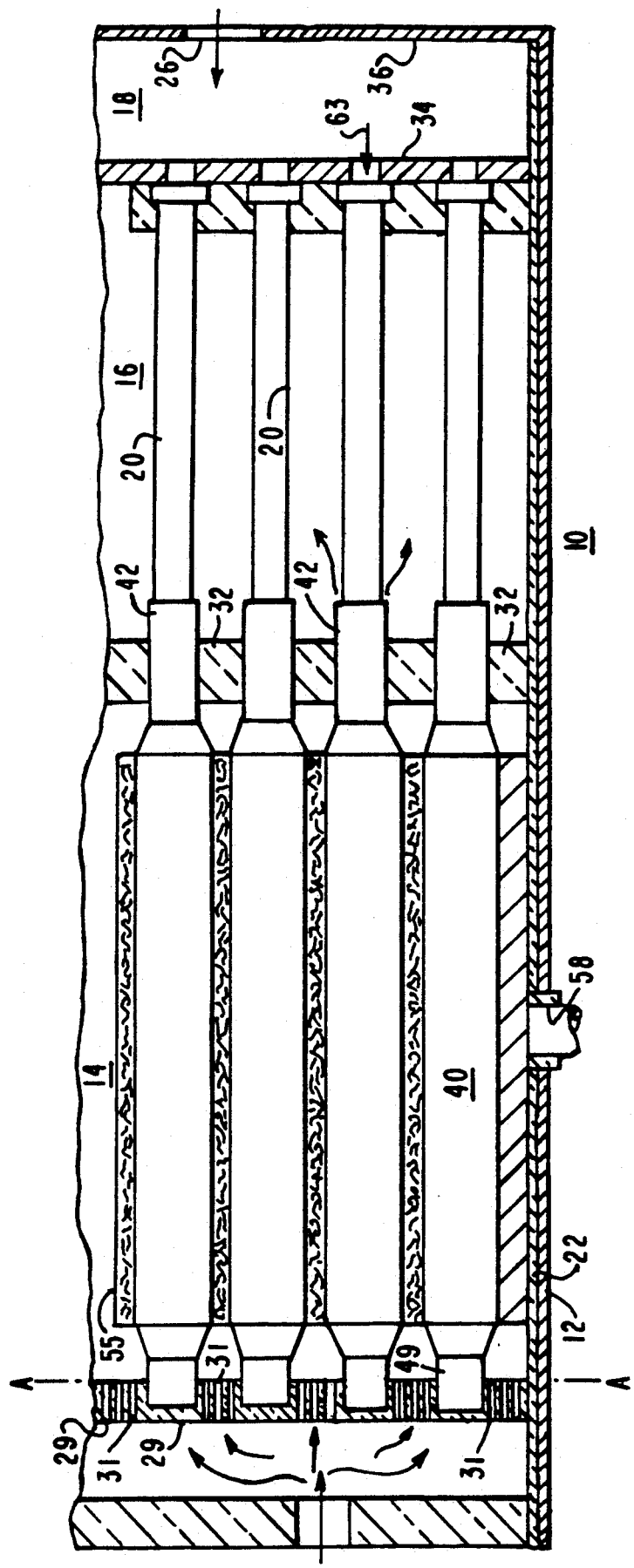
FIG. 1, which best shows the invention, is a view, partly in section, of one embodiment of the fuel cell generator apparatus of this invention, showing an end design for the fuel cells, and their insertion into the fuel distribution board and separator board.

Referring now to FIG. 1, there is shown one type of a fuel cell generator 10 including a gas-tight housing 12. The housing 12 surrounds a plurality of chambers including a generating chamber 14 and a combustion or preheating chamber 16. An oxidant inlet chamber 18 can also be contained within the housing 12. Alternatively, other means for manifolding an oxidant or exhausting depleted gases can be utilized. The housing 12 is preferably comprised of steel, and lined throughout with a thermal insulation 22, shown as a thin layer for the sake of simplicity, such as low density alumina insulation. Penetrating the housing 12 and insulation 22 is a fuel inlet port not shown, an air inlet port 26, and a combustion product outlet port also not shown, as well as ports for electrical leads 58.

In the design, the generating chamber 14 extends between a fuel distribution board 29, having fuel entry channels 31 therethrough, surrounding the inserted ends 44 of the fuel cells, and a porous separator 32, such as fibrous alumina felt board. The preheating chamber 16 extends between the porous separator 32 and a support structure for the gas inlet tube portion 20 of the fuel cells 40, such as a tube sheet 34. The oxidant inlet chamber 18 extends between the tube sheet 34 and another end wall 36 of the housing 12.

The shown barriers, the separator 32 and the tube sheet 34, need not be sealed structures. The separator 32, in particular, is designed to allow flow between the generating chamber 14, operating at an approximate pressure slightly above atmospheric, and the combustion chamber 16, operating at a slightly lower pressure. While the generator 10 is shown in a horizontal orientation in FIG. 1, it is usually operated in a vertical position, with the fuel distribution board 29 being at the bottom of the apparatus and the tube sheet 34 being at the top.

High temperature, elongated, annular, solid oxide electrolyte, electrochemical cells, such as fuel cells 40 extend between the preheating chamber 16 and the generating chamber 14. The cells have completely open ends 42 in the combustion chamber 16, and an opposite plugged or closed end 49. The fuel cells are tubular, including a solid oxide electrolyte sandwiched between two electrodes. Each cell includes an air electrode, electrolyte, and fuel electrode.

Each individual cell generates approximately one volt, and a plurality are electronically interconnected, preferably in a series-parallel rectangular array, including rows and columns. Each cell in a row is electronically connected along its active length to the next adjacent cell, preferably through a nickel fiber interconnection felt 55 contacting their outer peripheries. Fuel flows about each cell and an oxidant, such as air, flows within each cell, the anode is on the outside of each cell and the cathode is on the inside. Cell-to-cell contact within a row is in parallel, among adjacent anodes. Each cell in a column is electronically interconnected in series to the next adjacent cell. In the preferred configuration, this interconnection is made from the inner cathode of one cell to the outer anode of the next consecutive cell, through the interconnection felts 54.

Figure 2:
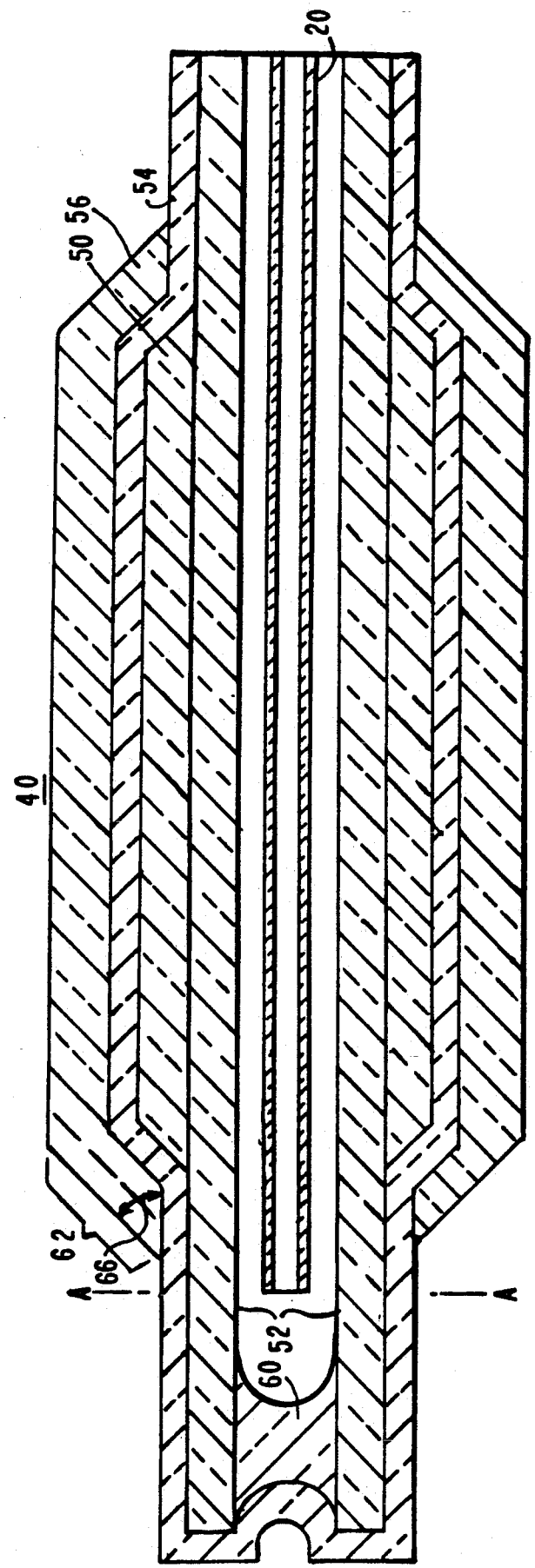
FIG. 2 is a cross-sectional view of one embodiment of a design for the fuel cells.

Referring to FIG. 2, a cross-sectional view of one design of a fuel cell 40 used in the invention is shown. While the fuel cell can have a self-supporting inner air electrode, the air electrode support tube 52, when used, as in FIG. 2, is comprised of calcia stabilized zirconia, which forms a wall porous to gas permeation, approximately 1 mm to 2 mm thick. The air electrode cathode 50, surrounding the outer periphery of the support tube 52, is typically a composite oxide structure about 20 micrometers to about 200 micrometers thick which is deposited onto the support tube through well-known techniques such as plasma spraying, or spraying or dipping in a slurry followed by sintering. Dense electrolyte 54 and porous fuel electrode 56 are also shown. An interconnect layer on top of the fuel electrode is not shown. The fiber metal interconnection felts 55, shown in FIG. 1, are attached to the interconnection material. A gas inlet tube 20 extending into fuel cell 40, is also shown.

The air electrode 50 may be made from doped or undoped oxide or mixture of oxides including but not limited to $LaMnO_3$, $CaMnO_3$, $LaNiO_3$, $LaCoO_3$ and $LaCrO_3$. A preferred air electrode material is $LaMnO_3$ doped with Sr. Over the electrode is a gas-tight solid electrolyte 54, typically yttria stabilized zirconia, about 1 micrometer to about 100 micrometers thick. A selected longitudinal segment along the electrode axial length is masked during deposition of the electrolyte, to provide a discontinuity, into which, an electronically conductive interconnect material, not shown, is deposited. The interconnect material must be electronically conductive in both an oxygen and fuel environment. The interconnect is typically made of lanthanum chromite doped with calcium, strontium, or magnesium. Surrounding the remainder of the cell except for the interconnect area is a fuel electrode 56 which functions as the anode. A typical anode is about 30 micrometers to 200 micrometers thick and is typically a nickel zirconia or cobalt zirconia cermet.

In a preferred mode of operation, a gaseous fuel, such as hydrogen or carbon monoxide, is directed over the outside of the cell to contact the fuel electrodes, and a source of oxygen passes through the gas inlet tube 20 inside the cells, to the end of the plugged cells where it reverses direction and contacts the inside of the air electrode 50 directly or through the porous support 52. The oxygen source forms oxygen ions at the electrode-electrolyte interface, which ions migrate through the electrolyte material to the anode, while electrons are collected at the cathode, thus generating a flow of electrical current in an external load circuit. A number of cells can be connected in series by electronic contact between the interconnect of one cell and the fuel electrode anode of another cell.

The cell construction in FIG. 2 shows one embodiment of a closed end plug 60. As can be seen in FIG. 2, which contains support tube 52, the exterior exposed layer of the fuel electrode 56 has a beveled form or edge 62 between 30° to 60° to the surface length of the fuel cell, as shown by angle 66, at each end of the fuel cell 40 as shown. In this embodiment, a "short" deposit of air electrode 50 is applied to the support 52, and sanded to bevel the edges. The electrolyte 54 and fuel electrode are then applied. The plug 60 is inserted a distance into the hollow tube so that it will be completely within the inner surface of the fuel distribution board, here shown as A—A.

In FIG. 2, the plug material is shown after being inserted by round faced plungers on each side, so that the exterior and interior faces of the plug are concave to the axial length of the fuel cell, as shown. As shown, dense electrolyte 54 surrounds the entire plugged and open ends of the cell. The plug can also have flat exterior and interior faces, perpendicular to the axial length of the fuel cell, rather than having curved axial faces, i.e., a simple, thick disc which is preformed and placed in the previously hollow, open end of the cell. When the air electrode is self-supporting, the plug will be made of air electrode material. When a support tube is used to support the air electrode, the plug will be made of support tube material. As shown, the closed end and the plug material 60 are completely disposed within the fuel distribution board, shown as 29 in FIG. 1, sealing the closed end from possible gas leaks during generator apparatus operation at about 600° to 1200° C. in a flow of fuel gas and oxygen or air.

Figure 3:
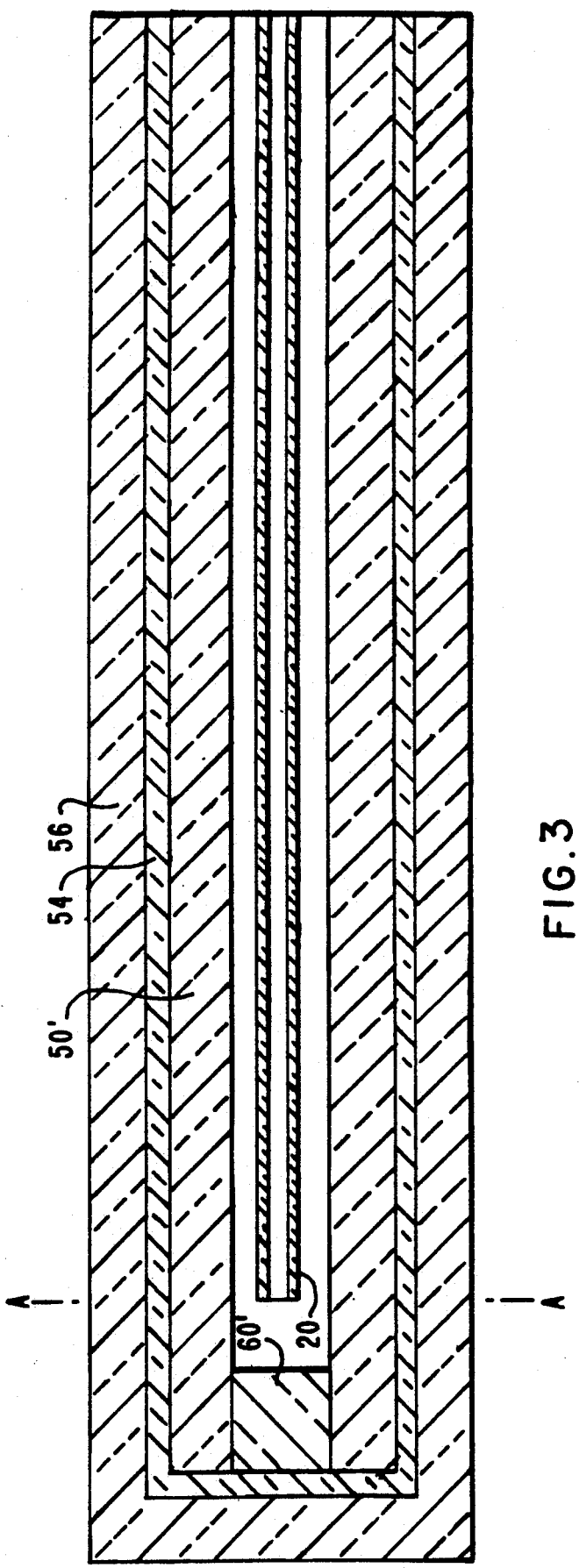
FIG. 3 is a cross-sectional view of another embodiment of a design for the fuel cells.

The flat faced plug 60' is shown in FIG. 3, which shows another embodiment of the fuel cell. Here, a self-supporting air electrode 50' is used. When the self-supporting air electrode is used, the electrolyte 54 as well as the exterior fuel electrode 56 surround the cell, and the fuel electrode is not usually beveled. The closed end 44 of the fuel cell in FIGS. 1, 2 and 3 can be rounded off if desired.

EXAMPLE

A fuel cell similar to that shown in FIG. 2 was constructed. A hollow support tube of $(ZrO_2)_{0.85}(CaO)_{0.15}$ was used having two open ends. A flat cylinder of $(ZrO_2)_{0.85}(CaO)_{15}$ having a slightly smaller circumference than the inside of the support tube was inserted into one end of the support tube, pushed into place, and the whole fired at 1400° C. to provide a good seal around the circumference of the plug. An air electrode of $La_{0.9}Sr_{0.1}MnO_3$ final composition was dip slurry applied and fired. The air electrode was sanded to provide an angled or beveled edge between 30° to 60°. Thus, only the support tube was present at each end of the cell. Then vapor deposition of a $(ZrO_2)_{0.9}(Y_2O_3)_{0.1}$ electrolyte was applied to the entire fuel cell as shown in FIG. 2. This was followed by application of a nickel particle layer and electrochemical vapor deposition of a $(ZrO_2)_{0.9}(Y_2O_3)_{0.1}$ skeleton around the nickel particles, to provide a beveled fuel electrode conforming to the beveled surfaces of the electrolyte and air electrode, as shown in FIG. 2.

Subsequently, similar cells as constructed above were placed in recesses in alumina substrates acting as fuel distribution boards, and supported on the other end by another board, in an experimental generator mock-up, so that the plug was completely inside the alumina substrate during successful testing at high temperature.

I claim:

1. A solid oxide fuel cell generator apparatus having a combustion chamber and a generating chamber and containing enclosed, long, hollow, tubular, solid oxide fuel cells containing an inner air electrode, an outer fuel electrode and solid electrolyte therebetween, said cells placed in the generator chamber between a fuel distribution board, and a separator which separates the combustion chamber from the generating chamber, where each fuel cell has an open end and a plugged, closed end, the plugged end being disposed within the fuel distribution board and the open end being disposed within the separator, and the plugged end of the fuel cell contains plug material, where the plug material is completely within the fuel distribution board, sealing such end from possible gas leaks.

2. The fuel cell generator apparatus of claim 1, where all the cells are bound together and electrically interconnected.

3. The fuel cell generator apparatus of claim 1, where the air electrode comprises $LaMnO_3$, the electrolyte comprises yttria stabilized zirconia, and the fuel electrode comprises nickel zirconia cermet.

4. The fuel cell generator apparatus of claim 1, where the air electrode and the plug are made of air electrode material.

5. The fuel cell generator apparatus of claim 1, where the air electrode is supported by a calcia stabilized zirconia support tube, and the plug is made of support tube material.

6. The fuel cell generator apparatus of claim 1, where the air electrode is supported by a zirconia support tube, and the fuel electrode has a beveled edge at each end of the fuel cell, where the bevel is between 30° to 60° to the axial length of the fuel cell.

7. The fuel cell generator apparatus of claim 1, where the plug is cylindrical.

8. The fuel cell generator apparatus of claim 1, where the plug has interior and exterior concave faces.

9. The fuel cell generator apparatus of claim 1, operating at 600° to 1200° C. in a flow of fuel gas and oxygen or air.

10. A solid oxide fuel cell generator apparatus having a combustion chamber and a generating chamber and containing enclosed, long, hollow, tubular, solid oxide fuel cells containing an inner air electrode, an outer fuel electrode and solid electrolyte therebetween, said cells placed in the generator chamber between a fuel distribution board, and a separator which separates the combustion chamber from the generating chamber, where each fuel cell has an open end and a plugged, closed end, the plugged end being disposed within the fuel distribution board and the open end being disposed within the separator, and the plugged end of the fuel cell contains plug material, where the plug material is completely within the fuel distribution board, sealing such end from possible gas leaks, where the fuel cell generator apparatus further comprises controls, an oxygen or air preheater, a fuel gas compressor, a source of fuel gas, and a heat recovery unit.

* * * * *